Patented June 6, 1933

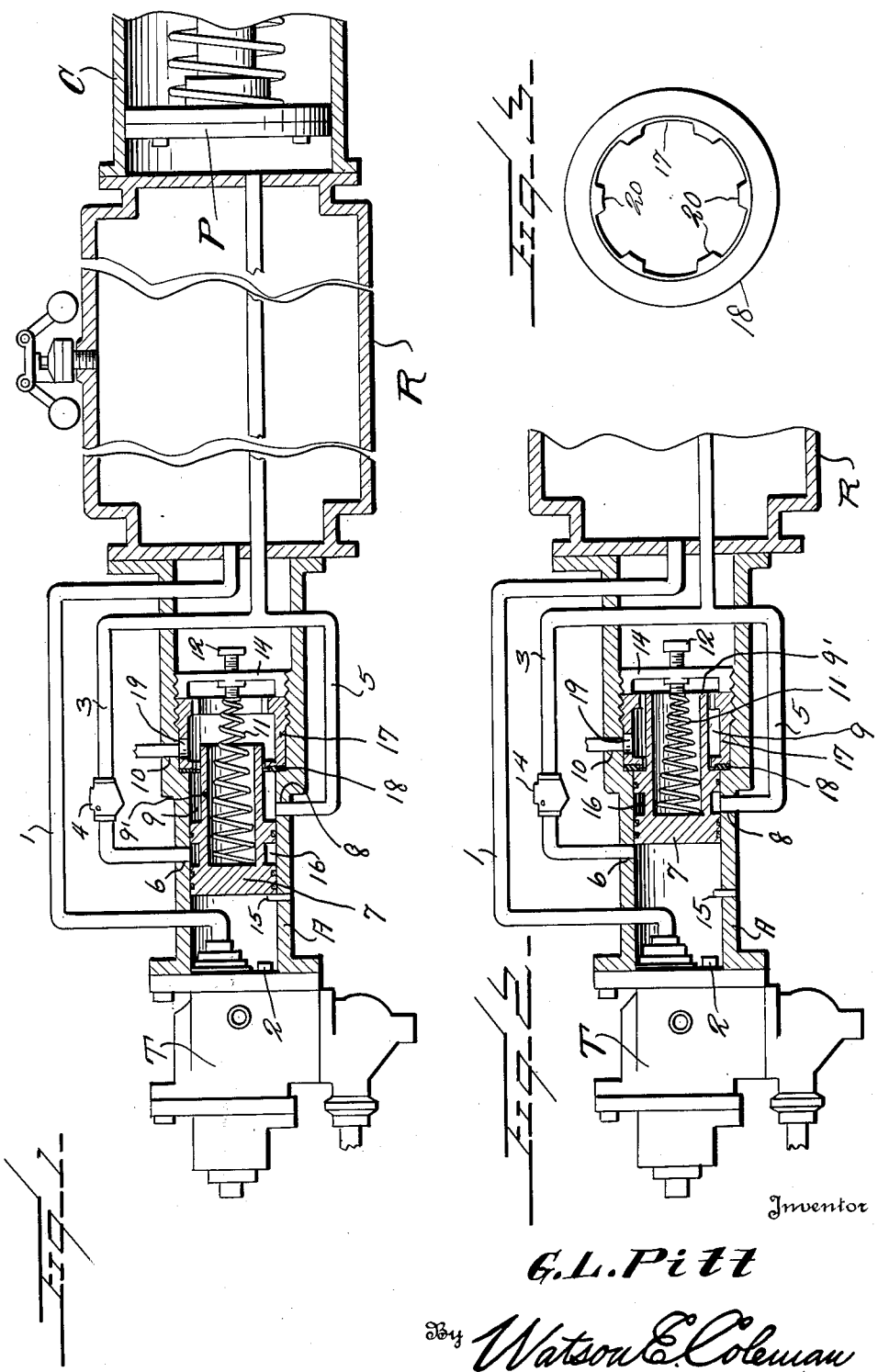
June 6, 1933. G. L. PITT 1,912,916
AIR BRAKE EQUIPMENT
Filed July 9, 1931

1,912,916

UNITED STATES PATENT OFFICE

GUY L. PITT, OF WILSON, NORTH CAROLINA

AIR BRAKE EQUIPMENT

Application filed July 9, 1931. Serial No. 549,735.

This invention relates to air brake equipment, and it is an object of the invention to provide means whereby release of the air within the brake cylinder is assured and wherein said means includes a sliding control valve so balanced to assure effective operation of such control valve at all times.

A further object of the invention is to provide an equipment of this kind wherein upon release the air within the brake cylinder is discharged or exhausted directly to the atmosphere without passing through the triple valve.

A still further object of the invention is to provide an equipment of this kind wherein independent release of air within the brake cylinder is under control of a reciprocating plunger, said plunger having movement from one position to another under the influence of air delivered from a triple valve, said movement placing a member under tension to return said plunger to initial position.

Another object of the invention is to provide an equipment of this kind including a sliding plunger having associated therewith means for preventing leakage past the plunger when the plunger is in set position thereby assuring the effective holding of the brakes.

An additional object of the invention is to provide an equipment of this kind operating in a manner to assure a positive and quick release of air from the brake cylinder together with a quick bleeding of such air without passing through the triple valve, thus eliminating hinderance or obstruction to the action of the triple valve which might occur as a result of dust or other foreign matter carried out with the air from the brake cylinder should the air exhaust out through the triple valve.

The invention consists in the details of construction and in the combination and arrangement of the several parts of my improved air brake equipment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a diagrammatic view illustrating a means constructed in accordance with an embodiment of my invention for use in connection with air brake equipment for facilitating the release of the brakes;

Figure 2 is a fragmentary view similar to Figure 1 but illustrating the controlling valve in a second position;

Figure 3 is an enlarged view in elevation of the outer end of the sleeve as herein disclosed unapplied.

As disclosed in the accompanying drawing, T denotes a conventional type of "K" triple valve from which leads a line 1 in communication with the conventional reservoir R which, as illustrated in Figure 1 of the accompanying drawing, is positioned in a well known manner immediately to the rear of the brake cylinder C. Interposed between the reservoir R and the triple valve T is an elongated cylinder A into which directly discharges the air from the valve T when it is desired to set the brakes as indicated by the nipple 2.

The end portion of the cylinder A immediately adjacent to the valve T forms a part of the line for delivering the air to the brake cylinder C and from said end portion of the cylinder A and in communication therewith leads the pipe line 3 having requisite communication with the cylinder C rearwardly of the operating piston P working in the cylinder.

This pipe line 3 has interposed therein a non-return or check valve 4 of any conventional or preferred construction and which serves to prevent pressure of the air within the cylinder C to pass back into the cylinder A.

Leading from the pipe line 3 at a point preferably rearwardly of the reservoir R is an exhaust line 5 which discharges within the cylinder A at a point in advance of the point of communication 6 between the line 3 and the cylinder A.

Snugly working within the cylinder A is an elongated reciprocating plunger 7 which, when at the limit of its movement toward the triple valve T, closes off the point of communication 6 from a point of communication 8 of the discharge line 5 with the cylinder A. When the plunger 7 is in this position the discharge line 5 discharges within an elongated annular peripheral channel or port 9 afforded by the reduced end portion 9' of the plunger 7 and with which also communicates an exhaust port 10 which may be continued through a suitable pipe line if desired and which port or line 10 discharges into the atmosphere. This port or line 10 may have employed in connection therewith a conventional retaining valve.

The plunger or valve member 7 is normally maintained at the limit of its movement toward the triple valve T or in position to maintain the port or channel 9 in communication with the line 5 and the port 10 by an expansible spring 11 interposed between the forward end of the plunger or valve member 7 and an endwise adjustable shank 12 herein disclosed as threaded through a suitable support 14 arranged within the cylinder A forwardly of the plunger or valve member 7. It is believed to be apparent that by adjusting the shank 12 the tension of the spring 11 may be regulated in accordance with the desired requirements of practice. Any means may be employed for positively limiting the movement of the plunger or valve member 7 under the action of the spring 11 but, as herein disclosed, the wall of the cylinder A is provided with an inwardly directed pin or part 15 with which the plunger or valve member 7 has direct contact.

With the plunger or valve member 7 in position as illustrated in Figure 1, the brakes are in release. When it is desired to apply the brakes, proper manipulation of the triple valve is effected whereupon the air from the reservoir R will pass through the valve T into the cylinder A and force the plunger or member 7 toward the reservoir R or against the tension of the spring 11. This movement will continue until the plunger or member 7 passes beyond and opens the communication 6.

At this time the plunger or member 7 is in a position to close the communication between the line 5 and port 10 and bringing a second peripheral port or channel 16 into register with the point 8 of communication between the line 5 and the cylinder A as particularly illustrated in Figure 2. By this means the pressure within the cylinder C will pass through the line 3 and the line 5 into the port or channel 16 and thereby further assure the proper balance of the plunger or member 7, thus assuring its ready and effective reciprocation as desired.

With the point of communication 6 open air will pass through the line 3 into the brake cylinder C for desired action upon the piston P. If it is desired to release the brakes, the triple valve T is operated in a manner to allow the exhaust of the air within the cylinder A and between the valve T and the plunger or valve member 7 through the triple valve. This exhaust permits the spring 11 to expand and to return the plunger or valve member 7 to its normal position illustrated in Figure 1 and under which condition, as hereinbefore explained, the communication 6 is closed and the communication 8 is opened.

Upon opening of the communication 8 the air within the cylinder C rearwardly of the piston P will exhaust through the line 5 and through the channel or port 9 out through the port or line 10 to the atmosphere, thus it will be noted that upon release of the brakes the discharge of the air within the brake cylinder C does not occur through the triple valve, thereby assuring an effective and immediate release of the brakes.

This discharge of air also is of further advantage as it eliminates the carrying of dust or foreign matter into the triple valve which would otherwise be liable to occur if such air discharged back through the triple valve as is now the general practice.

As the valve T is of a well known type it is not believed necessary that its construction and operation be described and illustrated in detail.

It is important that effective means be provided to prevent leakage or escape of air beyond the plunger 7 when in set position to assure effective holding of the brakes. In the present embodiment of my invention this is accomplished by threading or otherwise securing within the cylinder A sleeve 17, the inner end of which constituting a seat carrying a packing 18 against which the adjacent end of the plunger 7 has close contact when in set position. This contact of the plunger 7 with the packing 18 assures effective closing or sealing against leakage or escape of air beyond the plunger. As is clearly illustrated in the accompanying drawing, it is to be noted that the sleeve 17 is so located within the cylinder A to bring the seat at a point in advance of the exhaust port 10 so that the seal against air escape is at the effective point.

The reduced portion 9' of the plunger travels through the sleeve 17 to assure the proper travel of the air when the plunger 7 is in released position. The sleeve 17 is provided with a port or opening 19 in register with the exhaust port 10 or, in other words, such exhaust port 10 is continued through the sleeve.

It is also to be noted that the portion 9' of the plunger 7 is of a diameter less than the internal diameter of the sleeve 17 to further assure the requisite travel of the air when the plunger 7 is in release. The opposite end portions of the sleeve 17 are provided with inwardly disposed lugs and flanges 20 providing guiding means for said reduced portion 9' of the plunger 7. It is also to be noted that the spring 11 extends within the sleeve 17.

The support 14 may be threaded or otherwise fixed in desired position within the cylinder A.

This application is partly in continuation of my application Serial No. 544,189, filed June 13, 1931.

From the foregoing description it is thought to be obvious that an air brake equipment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In an air brake system, a triple valve, a brake cylinder, a cylinder with which the triple valve communicates, a pipe line leading from the second cylinder to the brake cylinder, a discharge line for the brake cylinder in communication with the second cylinder at a point in advance of the communication between the first named line and the second cylinder, said second cylinder having an exhaust port in advance of the communication between the discharge line and the second cylinder, a plunger snugly working within the second cylinder, said plunger having spaced peripheral annular channels therearound, means for maintaining the plunger in a position to close the flow of air from the triple valve through the first line to the brake cylinder and with one of the peripheral channels affording communication between the discharge line and exhaust port, said plunger upon initial admission of air into the second cylinder from the triple valve moving a distance to open the first named line and bringing the second peripheral channel of the plunger into registry with the discharge line.

2. In an air brake system, a triple valve, a brake cylinder, a cylinder with which the triple valve communicates, a pipe line leading from the second cylinder to the brake cylinder, a discharge line for the brake cylinder in communication with the second cylinder at a point in advance of the communication between the first named line and the second cylinder, said second cylinder having an exhaust port in advance of the communication between the discharge line and the second cylinder, a plunger snugly working within the second cylinder, said plunger having spaced peripheral annular channels therearound, means for maintaining the plunger in a position to close the flow of air from the triple valve through the first line to the brake cylinder and with one of the peripheral channels affording communication between the discharge line and exhaust port, said plunger upon initial admission of air into the second cylinder from the triple valve moving a distance to open the first named line and bringing the second peripheral channel of the plunger into registry with the discharge line, and a non-return valve interposed in the first named line.

3. In an air brake system, a triple valve, a brake cylinder, a cylinder with which the triple valve communicates, a pipe line leading from the second cylinder to the brake cylinder, a discharge line for the brake cylinder in communication with the second cylinder at a point in advance of the communication between the first named line and the second cylinder, said second cylinder having an exhaust port spaced from the communication between the second cylinder and the discharge line in a direction lengthwise of the second cylinder, a plunger snugly working within the second cylinder, said plunger having spaced peripheral annular channels therearound, means for maintaining the plunger in a position to close the flow of air from the triple valve through the first line to the brake cylinder and with one of the peripheral channels affording communication between the discharge line and exhaust port, said plunger upon initial admission of air into the second cylinder from the triple valve moving a distance to open the first named line and bringing the second peripheral channel of the plunger into registry with the discharge line.

In testimony whereof I hereunto affix my signature.

GUY L. PITT.